(12) United States Patent
Yano

(10) Patent No.: US 10,480,556 B1
(45) Date of Patent: Nov. 19, 2019

(54) MEMBER JOINING METHOD

(71) Applicant: Nissan Motor Co., Ltd., Yokohama-shi, Kanagawa (JP)

(72) Inventor: Yutaka Yano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/089,413

(22) PCT Filed: Apr. 28, 2016

(86) PCT No.: PCT/JP2016/063364
§ 371 (c)(1),
(2) Date: Sep. 28, 2018

(87) PCT Pub. No.: WO2017/187602
PCT Pub. Date: Feb. 11, 2017

(51) Int. Cl.
*B29C 44/18* (2006.01)
*B62D 25/04* (2006.01)
*B62D 27/02* (2006.01)
*F16B 11/00* (2006.01)
*B29C 65/00* (2006.01)
*B29C 44/12* (2006.01)
*B62D 29/00* (2006.01)

(52) U.S. Cl.
CPC .......... *F16B 11/006* (2013.01); *B29C 44/128* (2013.01); *B29C 44/18* (2013.01); *B29C 66/5221* (2013.01); *B62D 25/04* (2013.01); *B62D 27/023* (2013.01); *B62D 27/026* (2013.01); *B62D 29/002* (2013.01)

(58) Field of Classification Search
CPC ... B29C 44/1228; B29C 44/128; B29C 44/18; B29C 44/186; B29C 66/5221; B29C 66/5241; B62D 25/00; B62D 25/04; B62D 27/023; B62D 27/026; B62D 29/002; F16B 11/006
See application file for complete search history.

(56) References Cited

U.S. PATENT DOCUMENTS

| | | | | |
|---|---|---|---|---|
| 5,213,391 A | * | 5/1993 | Takagi | B29C 44/1228 29/451 |
| 5,804,608 A | | 9/1998 | Nakazato et al. | |
| 6,247,287 B1 | * | 6/2001 | Takabatake | B29C 44/18 264/46.6 |
| 6,378,933 B1 | * | 4/2002 | Schoen | B62D 29/002 296/187.02 |

(Continued)

FOREIGN PATENT DOCUMENTS

| | | |
|---|---|---|
| CN | 1951674 A | 4/2007 |
| CN | 105818365 A | 8/2016 |

(Continued)

*Primary Examiner* — Michael A Tolin
(74) *Attorney, Agent, or Firm* — Global IP Counselors, LLP

(57) ABSTRACT

A member joining method includes applying a first resin member to a first member and a second resin member to a second member and joining end portions of the first and second members together. The member joining method further includes integrally joining the first resin member of the first member and the second resin member of the second member by heat deformation to mix and cure areas adjacent the end portions at a time of coating.

4 Claims, 12 Drawing Sheets

(56) References Cited

U.S. PATENT DOCUMENTS

| | | | | |
|---|---|---|---|---|
| 6,478,367 B2* | 11/2002 | Ishikawa | ................ | B62D 25/04 |
| | | | | 296/199 |
| 7,445,400 B2 | 11/2008 | Takeuchi | | |
| 2007/0018483 A1* | 1/2007 | Kerscher | .............. | B62D 29/002 |
| | | | | 296/187.02 |
| 2008/0296164 A1* | 12/2008 | Dajek | .................. | B62D 29/002 |
| | | | | 205/80 |
| 2011/0024933 A1* | 2/2011 | Monnet | ................... | B29C 44/18 |
| | | | | 264/45.1 |

FOREIGN PATENT DOCUMENTS

| | | |
|---|---|---|
| JP | 61-41537 A | 2/1986 |
| JP | 61-116509 A | 6/1986 |
| JP | 2-255883 A | 10/1990 |
| JP | 10-181634 A | 7/1998 |
| JP | 10-203404 A | 8/1998 |
| JP | 10-273069 A | 10/1998 |
| JP | 2006-512456 A | 4/2006 |

\* cited by examiner

MEMBER JOINING METHOD

CROSS-REFERENCE TO RELATED APPLICATIONS

This application is a U.S. national stage application of International Application No. PCT/JP2016/063364, filed on Apr. 28, 2016.

BACKGROUND

Field of the Invention

The present invention relates to a member joining method for joining members to each other.

Background Information

Japanese Laid Open Patent Application No. 61-116509 (Patent Document 1) discloses filling a pillar with a foam by injecting a foamed polyurethane into a pillar of an automobile body.

SUMMARY

The technique disclosed in Patent Document 1 provides a vibration proofing and soundproofing effect by filling a pillar with a foam, but does not consider improving the joining strength between the members.

Therefore, an object of the present invention is to improve the joining strength between members.

In the present invention, the end portions of a first member and a second member are joined to each other, and a first resin member and a second resin member inside the first member and the second member are integrated by means of heat deformation when coated onto the first member and the second member.

According to the present invention, the first member and the second member, whose end portions are joined to each other, are integrated by the first resin member and the second resin member being joined; therefore, the joining strength between the two is improved.

DETAILED DESCRIPTION OF THE EMBODIMENTS

Embodiments for implementing the present invention are described in detail below with reference to the drawings.

Figure 1:
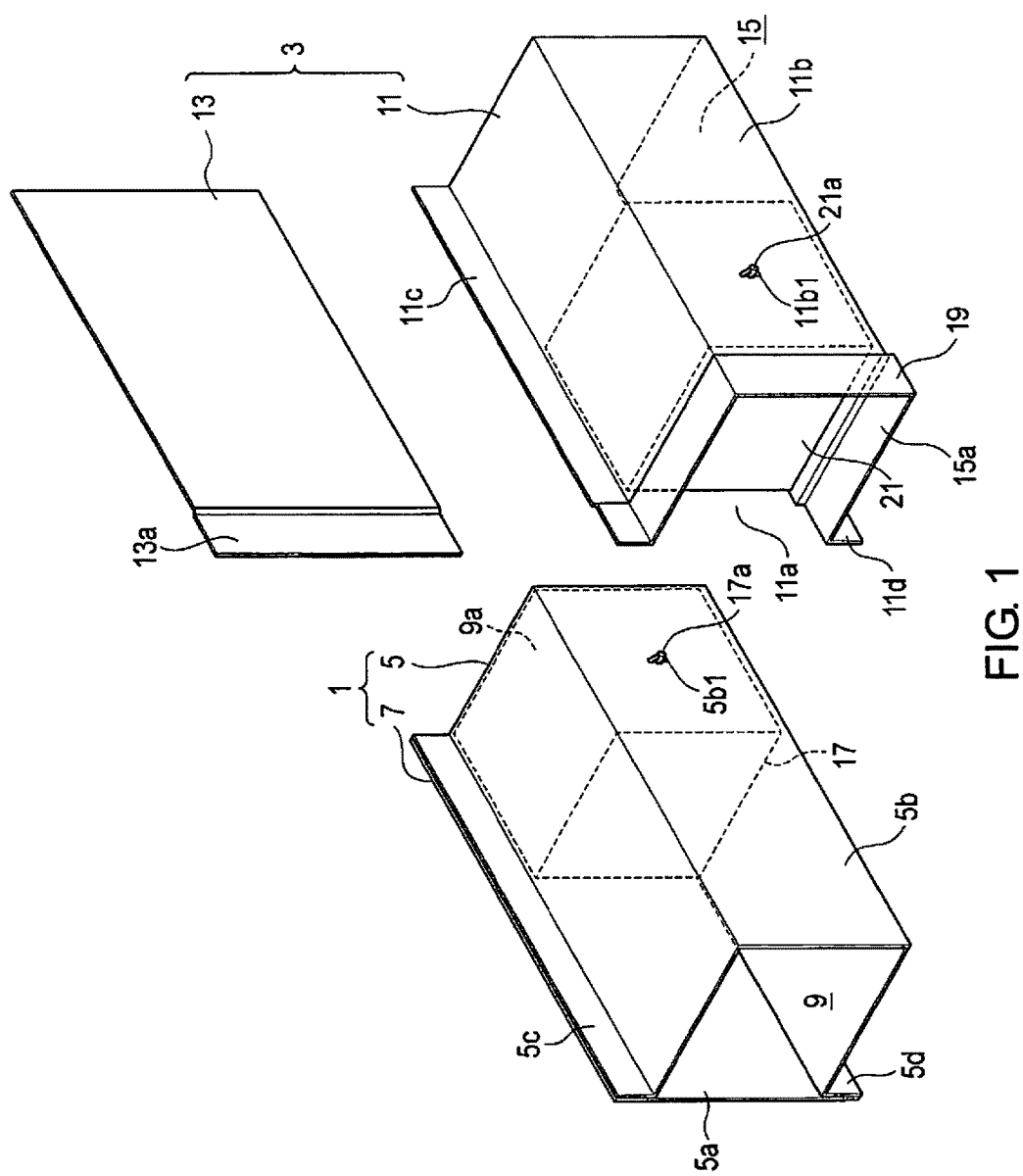
FIG. 1 is an exploded perspective view before joining a first member and a second member according to the member joining method of one embodiment of the present invention.
Figure 3:
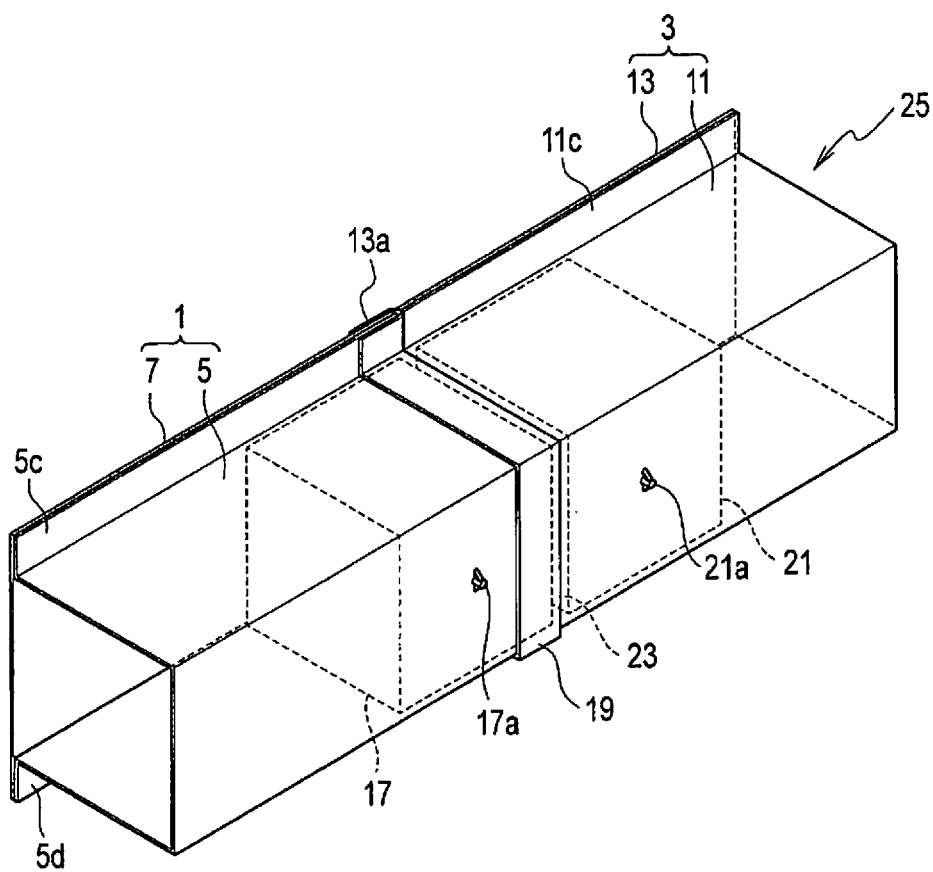
FIG. 3 is a perspective view illustrating a state in which a plate member of the second member of FIG. 2 is joined to a bent member.

The first member 1 and the second member 3 shown in FIG. 1 are integrated by the end portions thereof being joined to each other, as illustrated in FIG. 3. The first member 1 is made of metal and is composed of a bent member 5 having a hat-shaped cross section, and a rectangular plate member 7. The bent member 5 has an open portion 5a on one side surface, and forms a rectangular closed cross-sectional space 9 with the plate member 7 by welding and securing the plate member 7 so as to close the open portion 5a.

In the same manner, the second member 3 is also made of metal and is composed of a bent member 11 having a hat-shaped cross section, and a rectangular plate member 13. The bent member 11 has an open portion 11a on one side surface, and forms a rectangular closed cross-sectional space 15 with the plate member 13 by securing the plate member 13 by welding so as to close the open portion 11a.

As illustrated in FIG. 1, the first member 1 accommodates a foamable epoxy 17 prior to foaming as a first resin member adjacent an opening 9a corresponding to one end portion of the closed cross-sectional space 9 inside the bent member 5, before the plate member 7 is secured by welding to the bent member 5. The foamable epoxy 17 has a cross-sectional shape consisting of a cube or a rectangular parallelepiped equivalent to that of the closed cross-sectional space 9, and the outer surface thereof is substantially in close contact with the inner surfaces of the bent member 5 and the plate member 7.

A positioning hole 5b1 is formed on the surface 5b on the opposite side of the open portion 5a of the bent member 5. On the other hand, a positioning protrusion 17a is provided on a side of the foamable epoxy 17 opposite the open portion 5a. By pushing and inserting the foamable epoxy 17 from the open portion 5a of the bent member 5, the protrusion 17a is inserted and positioned in the positioning hole 5b1.

Then, flanges 5c, 5d of the bent member 5 and the plate member 7 are joined and secured by welding. At this time, the opening 9a side end portions of the bent member 5 and the plate member 7 are in the same surface position, and these end portions and the end surface of the foamable epoxy 17 are substantially matched to be in substantially the same surface position.

Figure 2:
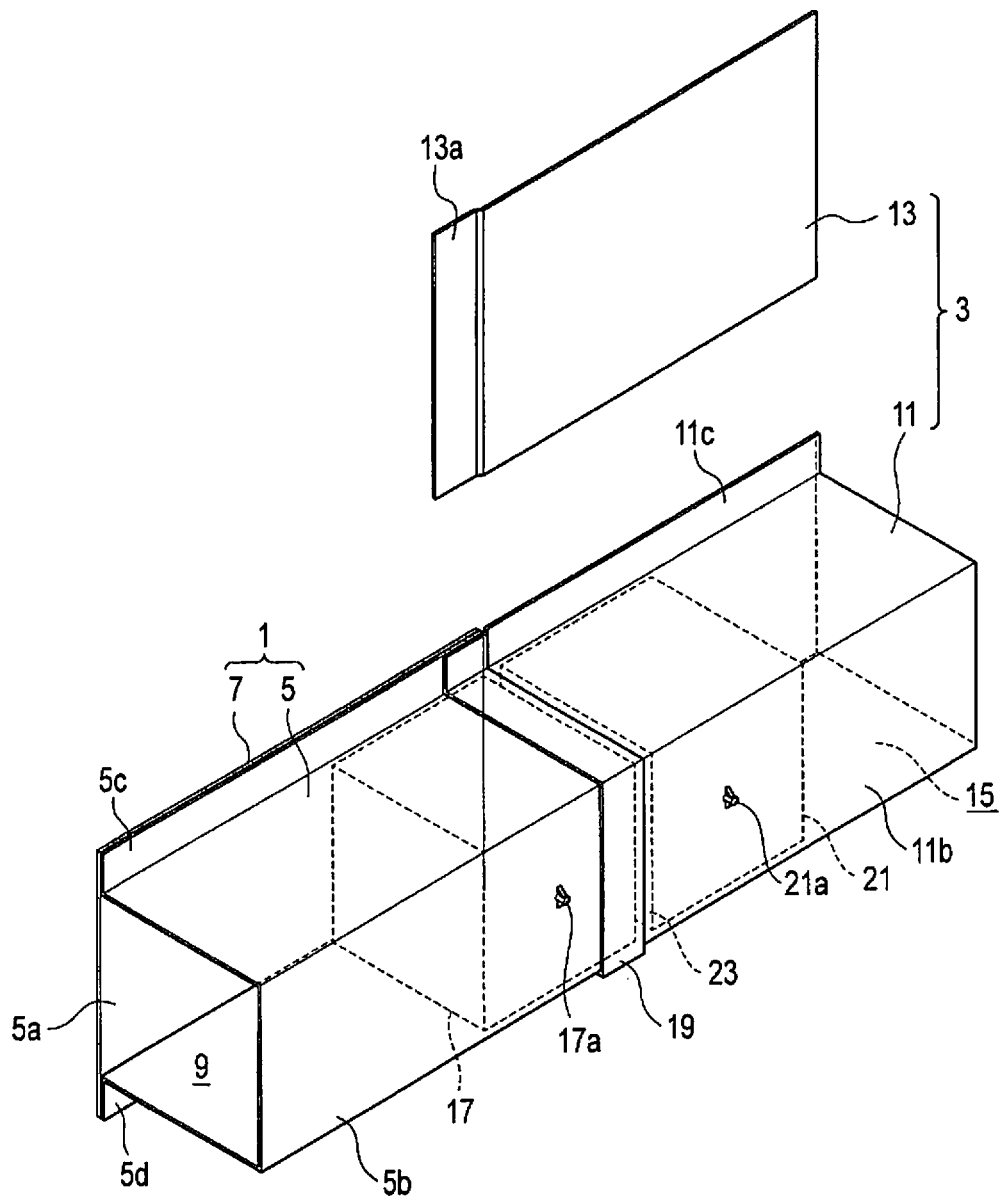
FIG. 2 is a perspective view illustrating a state after the first member and the second member of FIG. 1 have been joined.

As illustrated in FIG. 1, the bent member 11 of the second member 3 has an expanded portion 19 that is formed by bending an opening 15a side, corresponding to one end portion of the closed cross-sectional space 15 inside the bent member 11, so as to expand outward over the entire perimeter. The end portion of the first member 1 on the opening 9a side is inserted into the expanded portion 19, as illustrated in FIGS. 2 and 3. The plate member 13 has a bent portion 13a corresponding to the expanded portion 19, which is bent in a direction away from the expanded portion 19.

The second member 3 accommodates a foamable epoxy 21 prior to foaming as a second resin member adjacent an opening 15a corresponding to one end portion of the closed cross-sectional space 15 inside the bent member 11, in a position interfering with the expanded portion 19, before the plate member 13 is joined and secured to the bent member 11. The foamable epoxy 21 has a cross-sectional shape consisting of a cube or a rectangular parallelepiped equivalent to that of the closed cross-sectional space 15, and the outer surface thereof is substantially in close contact with the inner surfaces of the bent member 11 and the plate member 13.

A positioning hole 11b1 is formed on the surface 11b on the opposite side of the open portion 11a of the bent member 11. On the other hand, a positioning protrusion 21a is provided on a side of the foamable epoxy 21 opposite the open portion 11a. By pushing and inserting the foamable epoxy 21 from the open portion 11a of the bent member 11, the protrusion 21a is inserted and positioned in the positioning hole 11b1.

Then, the end portion of the first member 1 on the side of the opening 9a is inserted and disposed inside the expanded portion 19 of the bent member 11, and secured by welding, as illustrated in FIG. 2. In as state in which the first member and the bent member 11 of the second member 3 are secured by welding as illustrated in FIG. 2, the flanges 11c, 11d of the bent member 11 and the plate member 13 are joined and secured by welding, as illustrated in FIG. 3. At this time the bent portion 13a of the plate member 13 is positioned overlapping the plate member 7 in a position corresponding to the expanded portion 19, and then secured by welding.

In the state shown in FIG. 3, a gap 23 is formed between the foamable epoxy 17 and the foamable epoxy 21. In order to form the gap 23, the foamable epoxy 21 is disposed at a position that is slightly separated from the expanded portion 19.

In the state shown in FIG. 3, a joined member 25, which is obtained by welding and joining the first member 1 and the second member 3, is heated at the time of coating, for example, in a curing step, and the foamable epoxies 17, 21 therein are also heated. The foamable epoxies 17, 21 foam and expand when heated, and the mutually opposing portions approach each other so as to fill the gap 23, and, in due time, come into contact and adhere to each other. At this time the foamable epoxies 17, 21 are deformed by receiving heat, and the areas adjacent the end portions of on the sides of the openings 9a, 15a mix together and harden, thereby enabling joining and integration.

Figure 4:
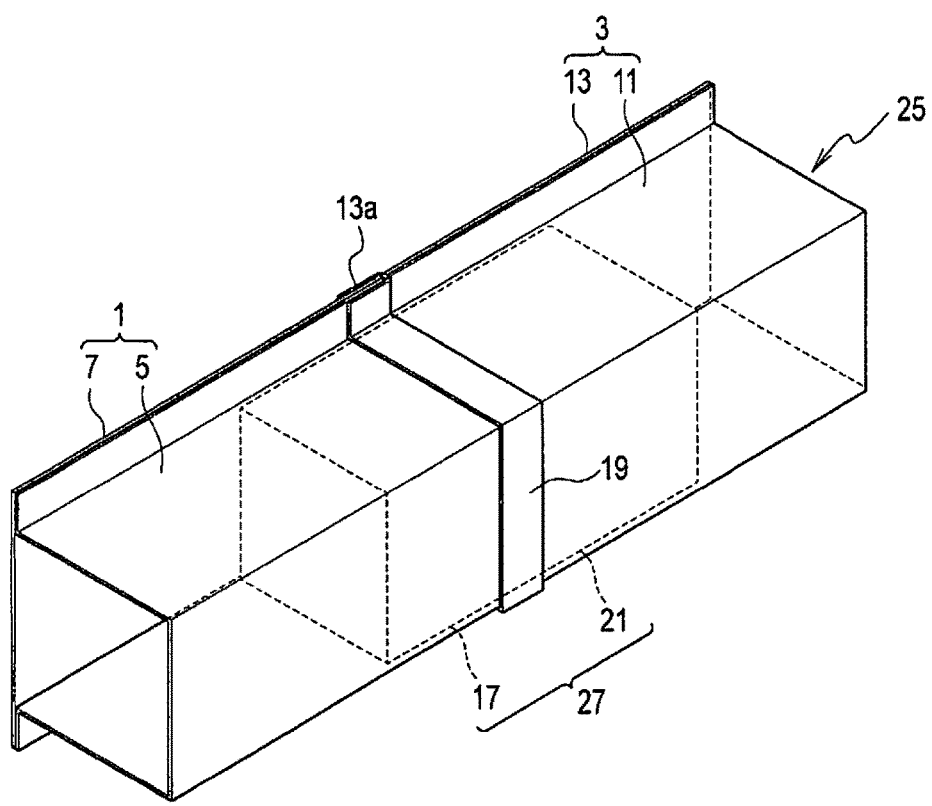
FIG. 4 is a perspective view illustrating a state in which foamable epoxies inside the first member and the second member receive heat and are foamed and integrated.

Due to expansion at the time of foaming, the outer peripheral surfaces of the foamable epoxies 17, 21 are respectively pushed against, and thereby brought into close contact with and joined to, the inner surfaces of the first member 1 and the second member 3. FIG. 4 illustrates a joined foam 27 obtained when the foamable epoxies 17, 21 are joined and integrated inside the joined member 25.

Thus, in a state in which the first member 1 and the second member 3 are joined by means of welding, the foamable epoxies 17, 21 disposed inside the closed cross-sectional spaces 9, 15, respectively, are joined to each other and integrated to form the joined foam 27. Consequently, in addition to the joining force due to welding, the joining strength between the first member 1 and the second member 3 resulting from the member joining method described above is further improved by the joining force that is generated due to the integration of the resin.

In the present embodiment, the foamable epoxies 17, 21 are heated by the heat that is generated when coating the first member 1 and the second member 3, which are joined to each other. Accordingly, it is unnecessary to provide additional equipment such as a dedicated heating furnace, thus contributing to cost reduction.

Because the strength after curing is higher compared to other foam materials, such as foamable urethane, foamable epoxy 17, 21 is extremely effective for increasing the joining strength between the first member 1 and the second member 3.

The foamable epoxies 17, 21 expand smoothly due to foaming after heating, thanks to the gap 23 provided therebetween, as illustrated in FIGS. 2 and 3. As a result, it becomes easy for the foamable epoxies 17, 21 to mix at the time of foaming, which further improves the joining strength.

In addition, by providing the gap 23, it becomes possible to prevent the foamable epoxies 17, 21 from coming into contact with each other when the first member 1 and the second member 3, in the state shown in FIG. 1, are abutted to achieve the state shown in FIG. 2. Accordingly, it becomes easy to insert and dispose the end portion of the first member 1 in a specified position inside the expanded portion 19 of the second member 3, and to reliably join the first member 1 and the second member 3.

In the embodiment described above, when forming the gap 23, the foamable epoxy 21 is disposed in a position separated from the expanded portion 19. Alternatively, the foamable epoxy 17 can be shifted from the end portion of the first member 1 on the opening 9a side so as to be positioned inside the closed cross-sectional space 9.

Additionally, with regard to the second member 3 in the embodiment described above the bent member 11 is joined to the first member 1 before the plate member 13 is joined, as illustrated in FIG. 2. Alternatively, the end portion of the first member 1 can be inserted in a space surrounded by the bent portion 13a and the expanded portion 19 of the second member 3 and joined, after the plate member 13 has been joined to the bent member 11. Alternatively, the bent members 5, 11 can be joined to each other first before the plate members 7, 13 are respectively joined to the corresponding bent members 5, 11, and then the plate members 7, 13 can be sequentially joined.

The foamable epoxies 17, 21 can be inserted and disposed inside the bent members 5, 11 either before or after the bent members 5, 11 are joined to each other, as long as it is before the plate members 7, 13 are respectively joined to the corresponding bent members 5, 11. In addition, the foamable epoxies 17, 21 can be pushed and inserted into the closed cross-sectional spaces 9, 15 from, for example, the openings 9a, 15a, after the plate members 7, 13 are respectively joined to the corresponding bent members 5, 11 to form the closed cross-sectional spaces 9, 15. Instead of providing positioning protrusions 17a, 21a, the foamable epoxies 17, 21 can be secured to the inner surfaces of the first member 1 and the second member 3 by an adhesive. Positioning protrusions 17a, 21a and an adhesive can both be used.

Figure 5:
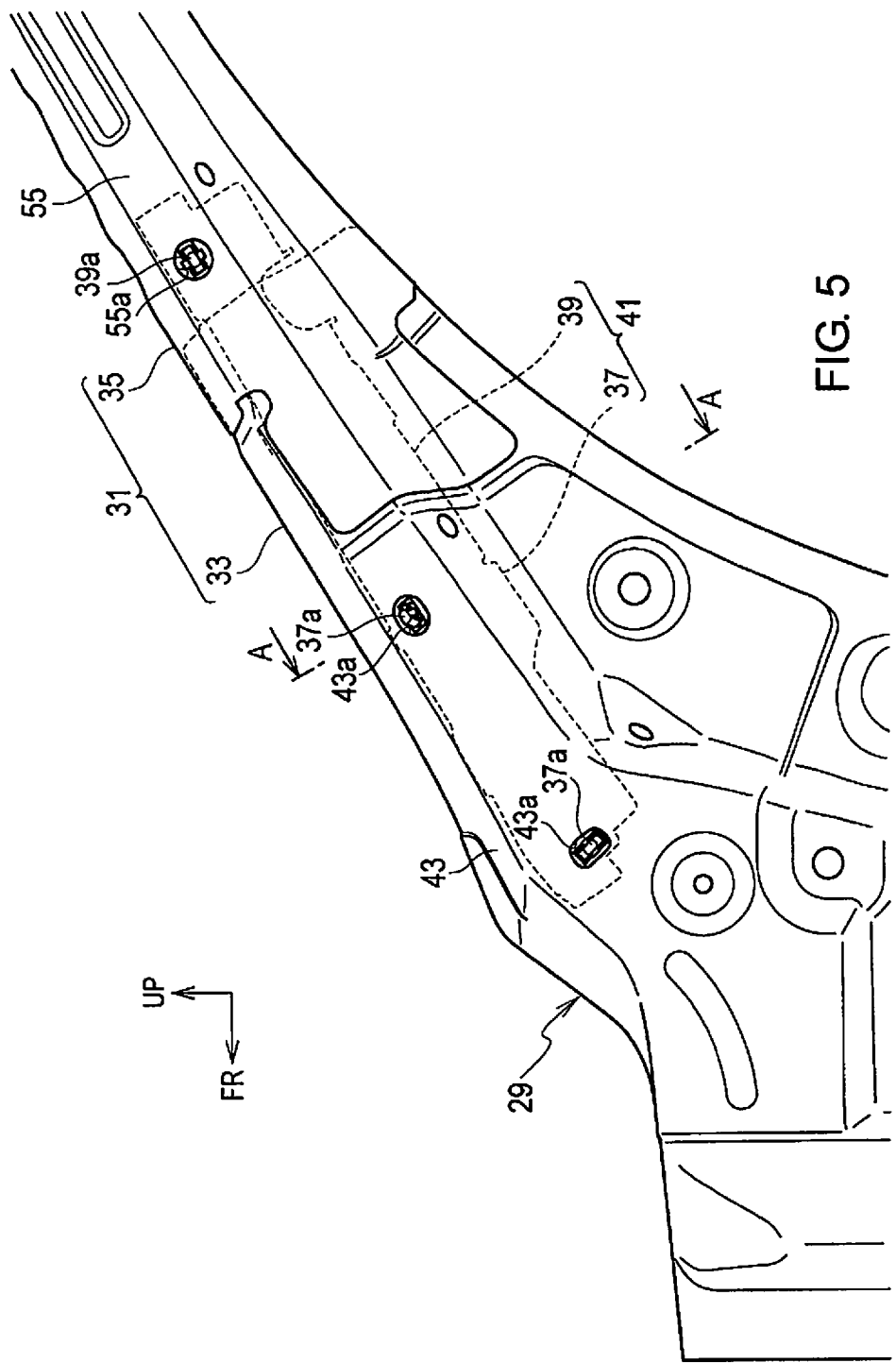
FIG. 5 is a side view illustrating an example in which the member joining method of the present invention is applied to a front pillar of an automobile as seen from the outside of the vehicle body.
Figure 6:
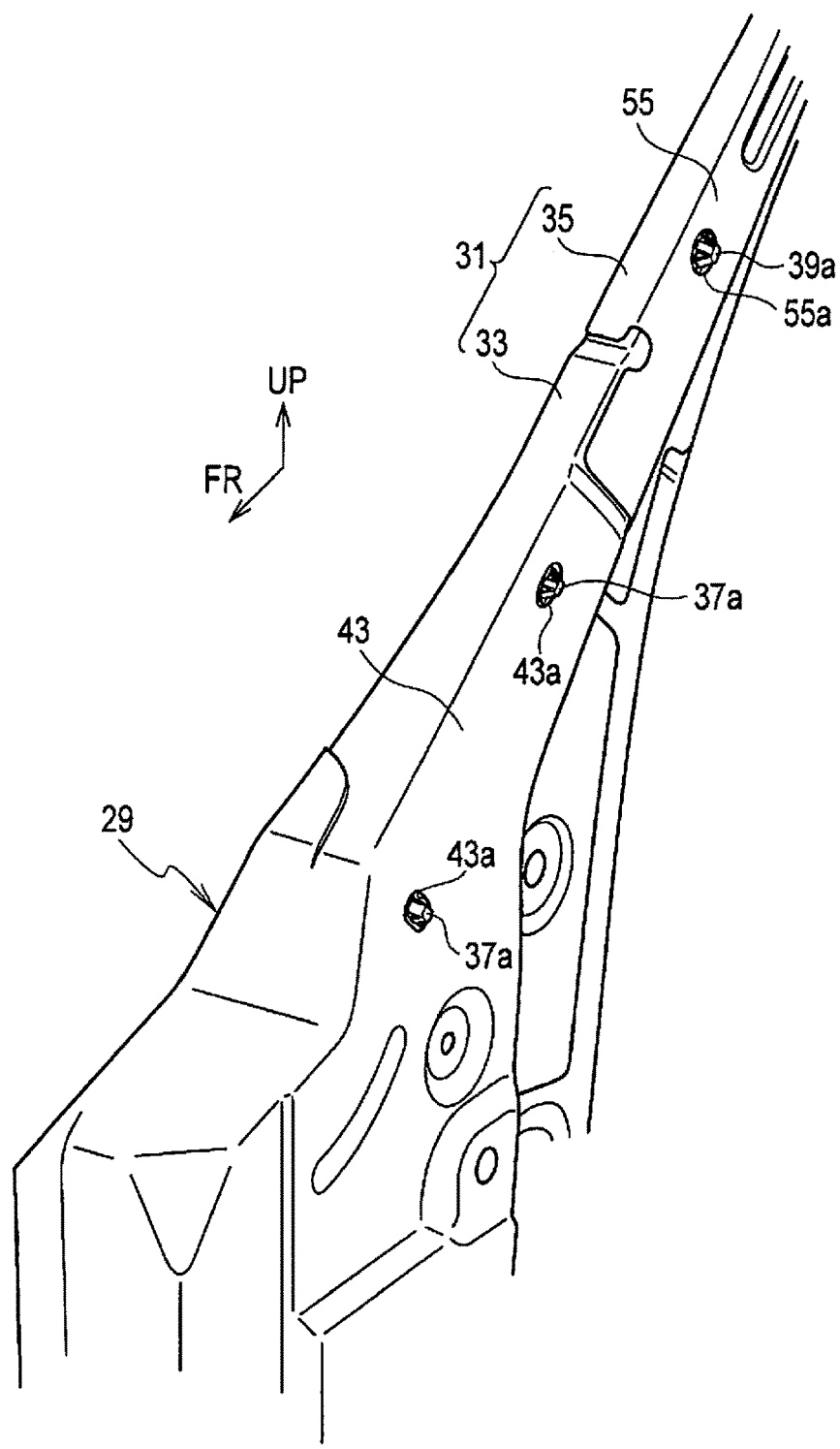
FIG. 6 is a perspective view of the periphery of the front pillar of FIG. 5 as seen from the front of the vehicle body.
Figure 7:
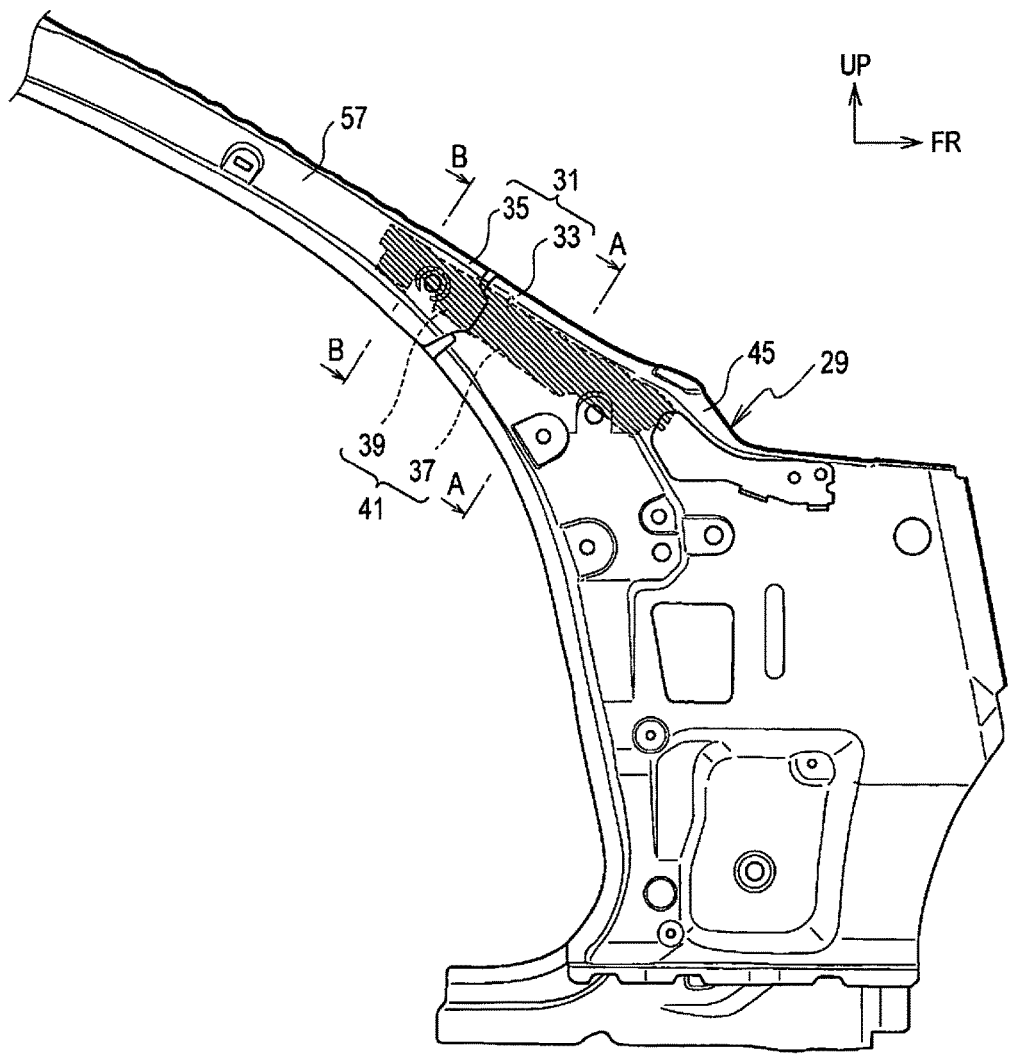
FIG. 7 is a perspective view of the periphery of the front pillar of FIG. 5 as seen from the inside of the vehicle body.

FIGS. 5-7 illustrate a state in which the joined member 25 obtained by joining the first member 1 and the second member 3 shown in FIG. 4 by means of welding is applied to a body member of an automobile, corresponding to a state after the joining of FIG. 4. The body member here is a front pillar 31 of a body 29 of an automobile, and the front pillar 31 includes a first member and a second member. In the figure, the direction indicated by the arrow FR is the front of the body, and the direction indicated by the arrow UP is the upper direction of the body. FIG. 5 is a side view of the inner side of the vehicle as seen from the outside of the vehicle, and FIG. 7 is a side view of the outside of the vehicle as seen from the inner side of the vehicle, in contrast with FIG. 5.

The front pillar 31 includes a pillar base portion 33 positioned on the lower front fender side, and a pillar body 35 positioned on the upper roof side. The front pillar 31 is configured by joining the end portions of the pillar base portion 33 and the pillar body 35 to each other. The foamable epoxy 37 on the pillar base portion 33 side and the foamable epoxy 39 on the pillar body 35 side are joined, in a state in which the pillar base portion 33 and the pillar body 35 are joined, to form a joined foam 41 that is similar to the joined foam 27 of FIG. 4. Either one of the foamable epoxies 37, 39 constitutes the first resin member, while the other constitutes the second resin member.

Figure 8:
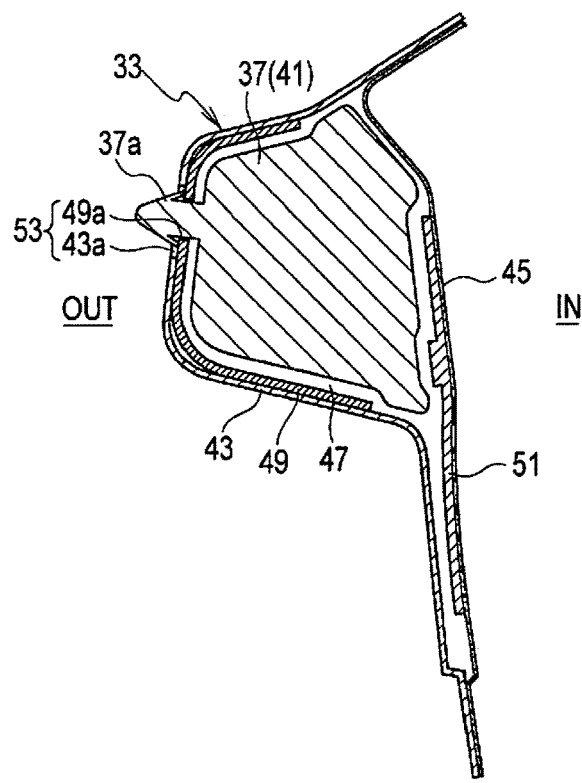
FIG. 8 is a cross-sectional view of the front pillar taken along line A-A in FIG. 7.
Figure 10:
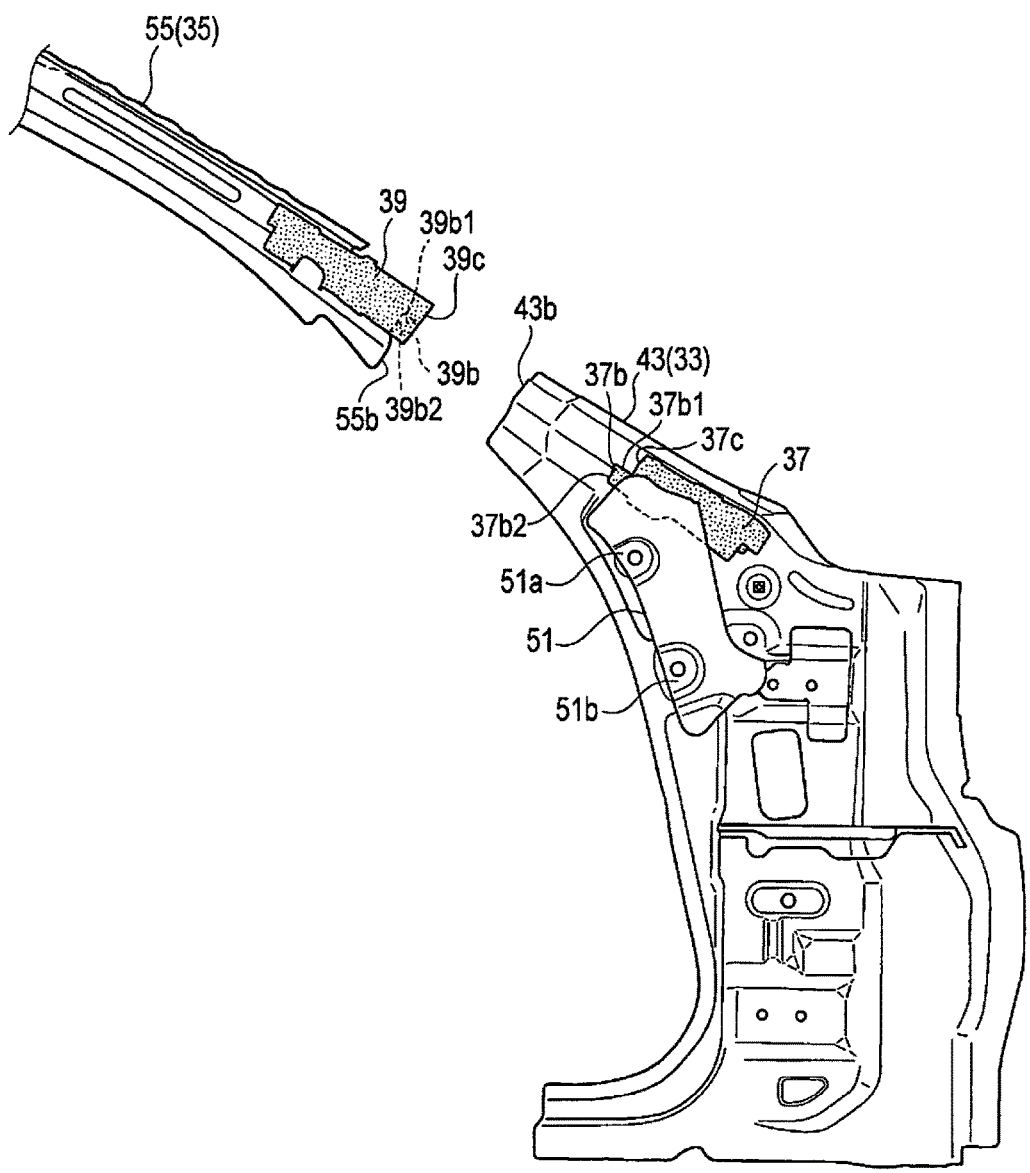
FIG. 10 is an assembly process view, illustrating a state in which foamable epoxy is disposed on a pillar base portion of the front pillar and on each outer member of a pillar body.
Figure 11:
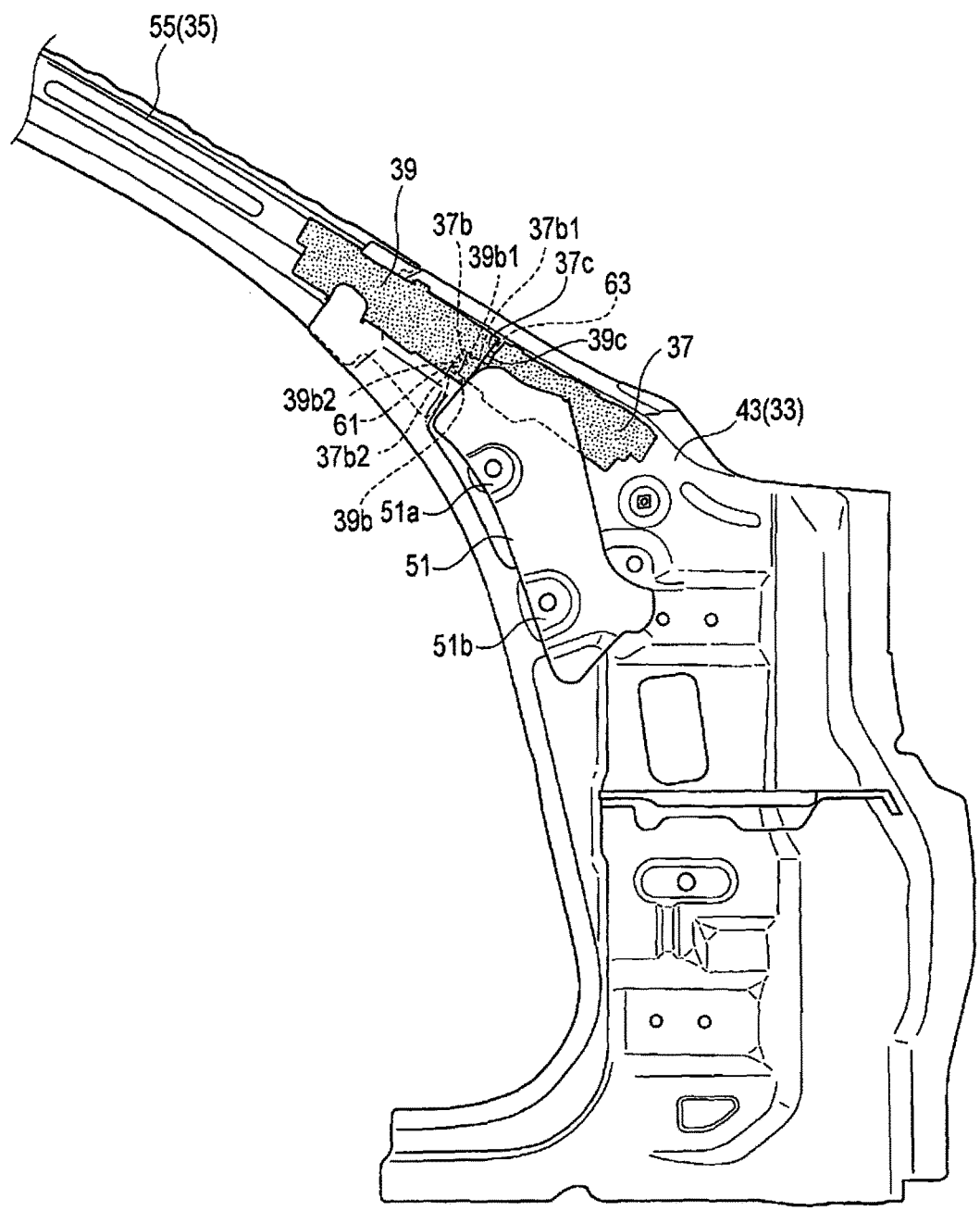
FIG. 11 is an assembly process view, illustrating a state in which the pillar base portion and the outer members of the pillar body are joined to each other by means of welding from the state of FIG. 10.

The pillar base portion 33 includes an outer member 43 on the vehicle exterior OUT side, and an inner member 45 on the vehicle interior IN side (dash side), as illustrated in FIG. 8, which is a cross-sectional view taken along line A-A in FIG. 7. When bent so as to protrude to the vehicle exterior OUT side, the outer member 43 forms a closed cross-sectional space 47 with the inner member 45. A reinforcing member 49 is provided on the inner surface of a portion of the outer member 43 corresponding to the closed cross-sectional space 47. The bracket 51 is joined and secured to the outer member 43 at the joint portions 51a, 51b, as illustrated in FIGS. 10 and 11, which are described later, and is substantially in contact with the inner surface of the inner member 45, as illustrated in FIG. 8. Vehicle parts, which are disposed on the vehicle interior IN side, and which are not shown, are attached to the bracket 51.

A portion of the joined foam 41 corresponding to the foamable epoxy 37 after foaming is disposed in the closed cross-sectional space 47 illustrated in FIG. 8. In FIG. 8, a gap is formed between the foamable epoxy 37 after foaming and the inner wall of the closed cross-sectional space 47, but actually there is almost no gap, and the epoxy and the inner wall are in close contact.

A positioning hole 53 is provided by forming through-holes 43a and 49a in the outer member 43 and the reinforcing member 49, respectively, as illustrated in FIG. 8. A positioning protrusion 37a, which is inserted into the positioning hole 53, is provided on the foamable epoxy 37. The through-hole 49a is smaller than the through-hole 43a, and when the positioning protrusion 37a has been inserted into the positioning hole 53, the positioning protrusion is locked in the through-hole 49a, and is prevented from falling out. The lower positioning structure including the positioning protrusion 37a and the positioning hole 53 is set in two locations adjacent the two end portions of the foamable epoxy 37, in the longitudinal direction, as illustrated in FIG. 5.

Figure 9:
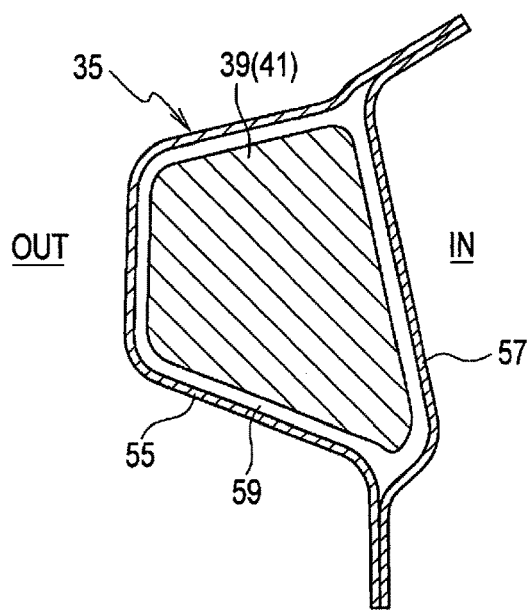
FIG. 9 is a cross-sectional view of the front pillar taken along line B-B in FIG. 7.

The pillar body 35 includes an outer member 55 on the vehicle exterior OUT side, and an inner member 57 on the vehicle interior IN side, as illustrated in FIG. 9, which is a cross-sectional view taken along line B-B in FIG. 7. When bent so as to protrude to the vehicle exterior OUT side, the outer member 55 forms a closed cross-sectional space 59 with the inner member 57. A portion of the joined foam 41 corresponding to the foamable epoxy 39 after foaming is disposed in the closed cross-sectional space 59. In FIG. 9, a gap is formed between the foamable epoxy 39 after foaming and the inner wall of the closed cross-sectional space 59, but actually there is almost no gap, and the epoxy and the inner wall are in close contact.

The outer member 55 is provided with a positioning hole 55a, and the foamable epoxy 39 is provided with a positioning protrusion 39a, as illustrated in FIG. 5. The foamable epoxy 39 is positioned on the outer member 55 by inserting the positioning protrusion 39a into the positioning hole 55a. The upper positioning structure including the positioning protrusion 39a and the positioning hole 55a is set in one location adjacent the end portion of the foamable epoxy 39 on the far side from the foamable epoxy 37.

Next, the assembly procedure will be described with reference to FIGS. 10-13.

FIG. 10 illustrates a state in which the foamable epoxy 37 and the foamable epoxy 39 before foaming are respectively disposed on the outer member 43 of the pillar base portion 33 and the outer member 55 of the pillar body 35. At this time, the positioning protrusion 37a of the foamable epoxy 37 is inserted into the positioning hole 53 and the positioning protrusion 39a of the foamable epoxy 39 is inserted into the positioning hole 55a, to thereby position the foamable epoxies 37, 39, as illustrated in FIG. 8. When carrying out the positioning described above, a portion of the foamable epoxy 37 is covered and held from the vehicle interior IN side by an upper end portion of the bracket 51, as illustrated in FIG. 10.

When being positioned on the outer member 43, the foamable epoxy 37 is disposed in a position retracted inwardly from a joint end portion 43b of the outer member 43, as illustrated in FIG. 10. Conversely, when being positioned on the outer member 55, the foamable epoxy 39 is disposed in a position protruding outwardly from a joint end portion 55b of the outer member 55.

The foamable epoxy 37 is provided with a protruding portion 37b at an end portion on the joint end portion 43b side, which protrudes toward the joint end portion 43b side on the lower side. On the other hand, the foamable epoxy 39 is provided with a recessed portion 39b on the vehicle exterior OUT side on the lower side of an end portion on the side that protrudes outward. The protruding portion 37b is inserted and disposed in the recessed portion 39b.

From the state shown in FIG. 10, the outer member 43 of the pillar base portion 33 and the outer member 55 of the pillar body 35 are joined by means of welding, by bringing the joint end portions 43b, 55b close to each other in the state shown in FIG. 11. At this time, the respective end portions of the outer members 43, 55 overlap each other such that the outer member 43 of the pillar base portion 33 is positioned closer to the vehicle interior IN side (the front side of the page in FIG. 11) than the outer member 55 of the pillar body 35. That is, the outer member 43 of the pillar base portion 33 is inserted between the foamable epoxy 39 and the outer member 55 of the pillar body 35.

In a state in which the end portions of the outer members 43, 55 overlap each other, the protruding portion 37b of the foamable epoxy 37 is inserted and disposed in the recessed portion 39b of the foamable epoxy 39, as illustrated in FIG. 11. When the protruding portion 37b is inserted and disposed in the recessed portion 39b, a lower surface 39b1 of the recessed portion 39b rests on an upper surface 37b1 of the protruding portion 37b.

Additionally, in the state shown in FIG. 11a distal end surface 37b2 of the protruding portion 37b is separated from a recess inner-end surface 39b2 of the recessed portion 39b, thus forming a lower gap 61 therebetween. Furthermore, an end surface 39c of the foamable epoxy 39 on the side that protrudes outward is separated from an end surface 37c of the foamable epoxy 37, thus forming an upper gap 63 therebetween.

Because the foamable resin is provided with the positioning structures at two locations configured by the two positioning protrusions 37a with respect to the outer member 43, the position of the foamable epoxy 37 is substantially fixed, as illustrated in FIG. 5. However, by provided the positioning structure at one location configured by one positioning protrusion 39a, on a side away from the foamable epoxy 37, as illustrated in FIG. 5, it becomes possible for the foamable epoxy 39 to be somewhat swingably displaced in the vertical direction, with the positioning protrusion 39a as the fulcrum.

As a result, the operation to place the lower surface 39b1 of the recessed portion 39b of the foamable epoxy 39 on the upper surface 37b1 of the protruding portion 37b of the foamable epoxy 37 becomes easy, when joining the end portions of the outer member 43 of the pillar base portion 33 and the outer member 55 of the pillar body 35 to each other.

Figure 12:
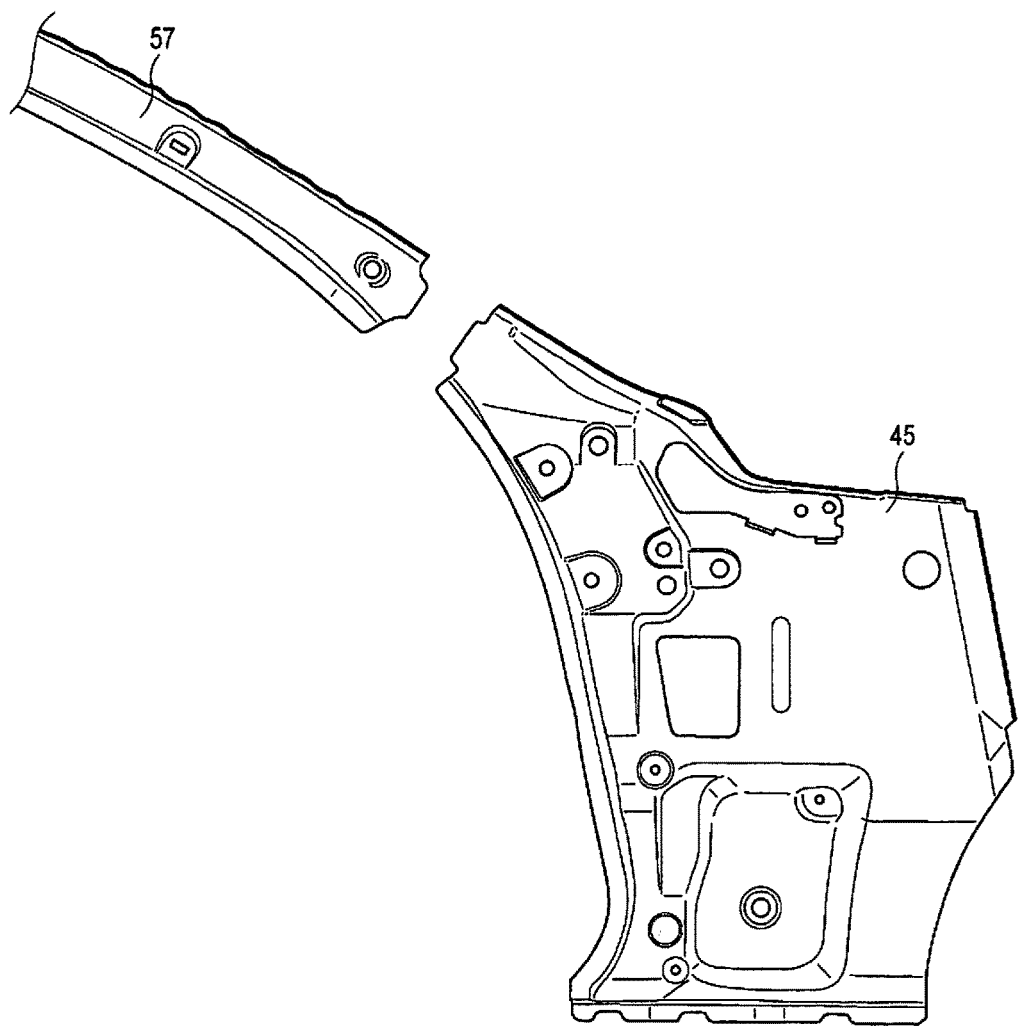
FIG. 12 is a side view illustrating each inner member that is joined to each outer member of FIG. 11 from the inner side of the vehicle.
Figure 13:
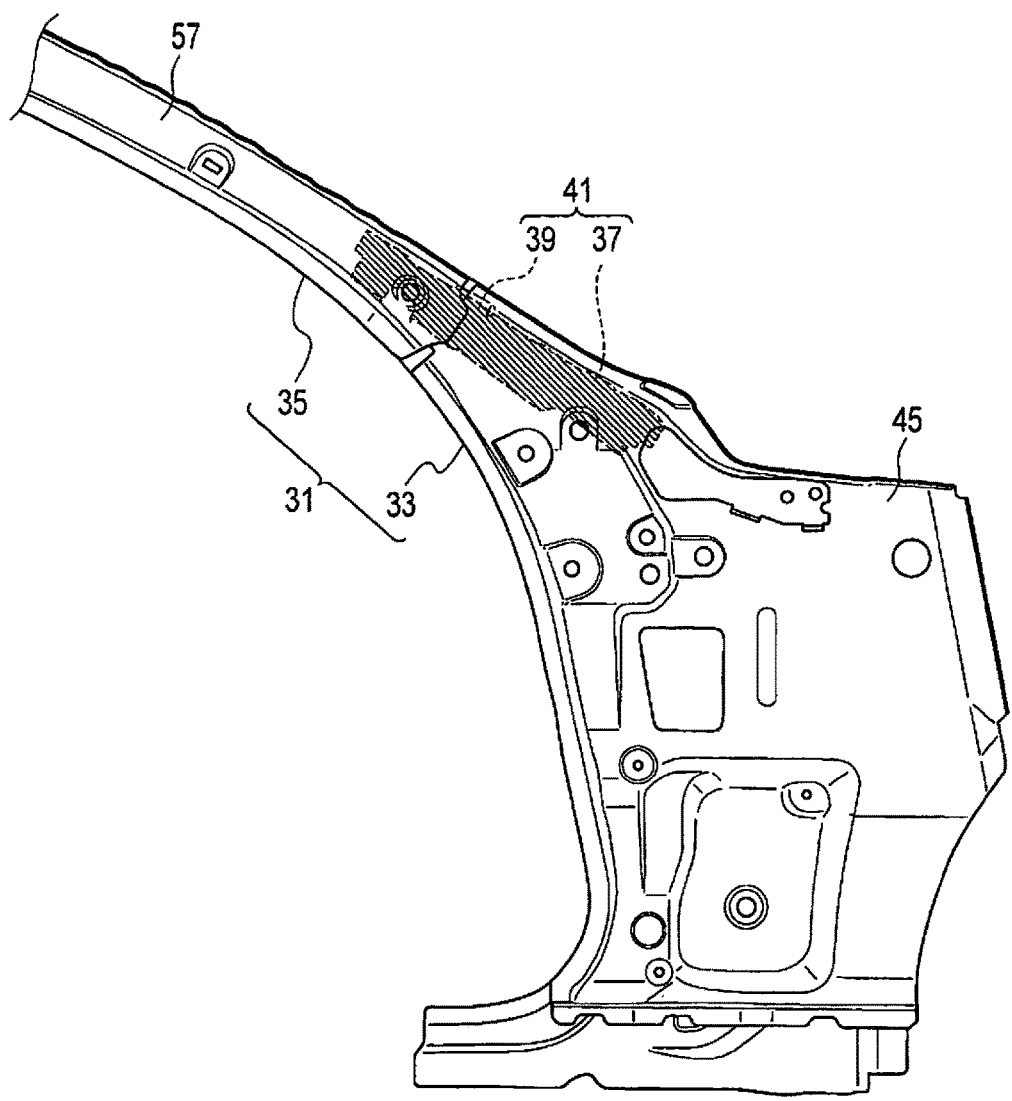
FIG. 13 is an assembly process view, illustrating a state in which each inner member of FIG. 12 is joined to each outer member of the pillar body and the pillar base portion illustrated in FIG. 11 by means of welding.

Next, the inner member 45 and the inner member 57 shown in FIG. 12 are placed on the outer member 43 and the outer member 55, respectively, as shown in FIG. 11, so as to overlap each other, as illustrated in FIG. 13, and the abutting portions are joined to each other by means of welding. At this time, the end portion of the inner member 57 is closer to the front surface side of the page in FIG. 13 (vehicle interior IN side) than the end portion of the inner member 45. As a result, the vehicle interior IN side of the foamable epoxies 37, 39 are covered by the inner members 45, 57, and will be housed and disposed inside the closed cross-sectional spaces 47, 59. The foamable epoxies 37, 39 before foaming are substantially in contact with, or form slight gaps with, the inner wall surfaces of the respective closed cross-sectional spaces 47, 59, when accommodated and disposed in the closed cross-sectional spaces 47, 59.

In the state shown in FIG. 13 the body 29 including the front pillar 31 is heated at the time of coating, for example, in a curing step, and the foamable epoxies 37, 39 therein are also heated. The foamable epoxies 37, 39 foam and expand when heated, and the mutually opposing portions approach each other so as to fill the lower gap 61 and the upper gap 63, as illustrated in FIG. 11, and, in due time, come into contact and adhere to each other. At this time, the foamable epoxies 37, 39 are deformed by receiving heat, and the areas in the vicinities of the end portions of the sides opposing each other, including the protruding portion 37b and the recessed portion 39b, mix together and harden, thereby enabling joining and integration to form a joined foam 41.

Additionally, due to expansion at the time of foaming, the outer peripheral surfaces of the foamable epoxies 37, 39 are respectively pushed against, and thereby brought into close contact with and joined to, the inner wall surfaces of the closed cross-sectional spaces 47, 59.

Thus, in a state in which the pillar base portion 33 and the pillar body 35 of the front pillar 31 are joined by means of welding, the foamable epoxies 37, 39 disposed inside the closed cross-sectional spaces 47, 59 are joined to each other and integrated so as to form the joined foam 41. Consequently, in addition to the joining force due to welding, the joining strength between the pillar base portion 33 and the pillar body 35 is further improved by the joining force that is generated due to the integration of the resin.

The first member and the second member whose end portions are joined to each other are included in the front pillar 31 of the body member. In this case, by increasing the joining strength between the pillar base portion 33 and the pillar body 35 of the front pillar 31, the crushing strength against a downward load received by the roof of the body from above is increased.

In the member joining method for joining the pillar base portion 33 and the pillar body 35 of the front pillar 31 described above, the foamable epoxies 37, 39 are disposed on the outer members 43, 55, respectively, before the end portions are joined to each other. Thereafter, when the end portions of the outer members 43, 55 are joined to each other, the inner members 45, 57 are joined to the outer members 43, 55, respectively. As a result, it becomes possible to dispose the foamable epoxies 37, 39 in the closed cross-sectional spaces 47, 59, which are formed between the outer members 43, 55 and the inner members 45, 57. The end portions of the foamable epoxies 37, 39 are reliably joined to each when heated and foamed inside the closed cross-sectional spaces 47, 59 described above.

Embodiments of the present invention were described above, but these embodiments are described in order to facilitate understanding of the present invention, and the present invention is not limited to the embodiments. The technical scope of the present invention is not limited to the specific technical matters disclosed in the above-described embodiments, and includes various modifications, changes, and alternatives that can be easily derived therefrom.

In the above-described embodiment, an example was described in which foamable epoxy is used as the first resin member and the second resin member, but the foam material is not limited to a foamable epoxy. For example, the foam material can be foamable urethane. In addition to a foam material, a resin member that is joined by means of heating and glass transition or melting can be used, for example nylon 66, which is a synthetic polyamide fiber.

Since nylon 66 has flowability at the melting point, it becomes necessary to provide a flow stopping member for preventing outflow of molten resin on the opposite side of the joining surface of the two resin members.

In the embodiment illustrated in FIGS. 5-11, the shapes of the end portions of the foamable epoxies 37, 39 on the sides to be joined are not limited to the shapes illustrated in FIGS. 10, 11. For example, in the state shown in FIG. 11, the foamable epoxies 37, 39 may simply be respectively provided with flat joining surfaces, with a gap therebetween, and without the protruding portion 37b and the recessed portion 39b.

The present invention is applied to a member joining method for joining members provided with closed cross-sectional spaces.

The invention claimed is:

1. A method of joining comprising:
  providing a first outer member and a first inner member, wherein the first outer member has an end portion and the first inner member has an end portion;
  providing a second outer member and a second inner member, wherein the second outer member has an end portion and the second inner member has an end portion;
  arranging a first resin member on the first outer member, wherein the first resin member has an end portion;
  arranging a second resin member on the second outer member, wherein the second resin member has an end portion;
  performing a first joining step comprising joining the respective end portions of the first and second outer members to each other;

performing a second joining step comprising joining the respective end portions of the first and second inner members to each other;

performing a third joining step comprising joining the first outer member to the first inner member to define a first space therebetween, wherein the first resin member is covered by the first inner member and is located within the first space;

performing a fourth joining step comprising joining the second outer member to the second inner member to define a second space therebetween, wherein the second resin member is covered by the second inner member and is located within the second space;

wherein the combined first, second, third and fourth joining steps produce an assembly comprising the first and second inner members, the first and second outer members, and the first and second resin members respectively located within the first and second spaces; and heating the assembly to cause the first and second resin members to expand such that the respective end portions of the first and second resin members join to each other and mix with each other, the step of heating the assembly further causing the first and second resin members to cure.

2. The method of joining according to claim 1, wherein:
the first resin member and the second resin member each comprise a foamable epoxy that foams when heated.

3. The method of joining according to claim 2, wherein:
the assembly forms part of a front pillar of an automobile.

4. The method of joining according to claim 1, wherein:
the assembly forms part of a front pillar of an automobile.

* * * * *